United States Patent [19]
Noguchi et al.

[11] Patent Number: 5,812,885
[45] Date of Patent: Sep. 22, 1998

[54] WATERPROOF CONSTRUCTION FOR CAMERA WITH CARRYING STRAP

[75] Inventors: Rika Noguchi, Sakai; Akihiro Baba, Izumi; Tomohiko Kawaji, Minamikawachi-Gun, all of Japan

[73] Assignee: Minolta Co., Ltd., Osaka, Japan

[21] Appl. No.: 777,590

[22] Filed: Dec. 31, 1996

[30] Foreign Application Priority Data

Jan. 4, 1996 [JP] Japan ................................ 8-000072

[51] Int. Cl.⁶ ................................................ G03B 17/08
[52] U.S. Cl. ............................................................. 396/29
[58] Field of Search ................................ 396/25, 26, 27, 396/28, 29, 419, 535

[56] References Cited

U.S. PATENT DOCUMENTS 5,333,022  7/1994  Katagiri et al. ............................ 396/29

*Primary Examiner*—Howard B. Blankenship
*Attorney, Agent, or Firm*—Burns, Doane, Swecker & Mathis, LLP

[57] ABSTRACT

A waterproof construction of a camera in which a portion of a member which is to be fixed to an exterior surface of a body frame of the camera is exposed from an opening provided on a body cover covering the body frame. In this construction, the member is retained to the internal surface of the body cover via a seal member such that a gap between the member and the body cover is sealed. The body cover retaining the member is attached to the body frame by screws.

5 Claims, 5 Drawing Sheets

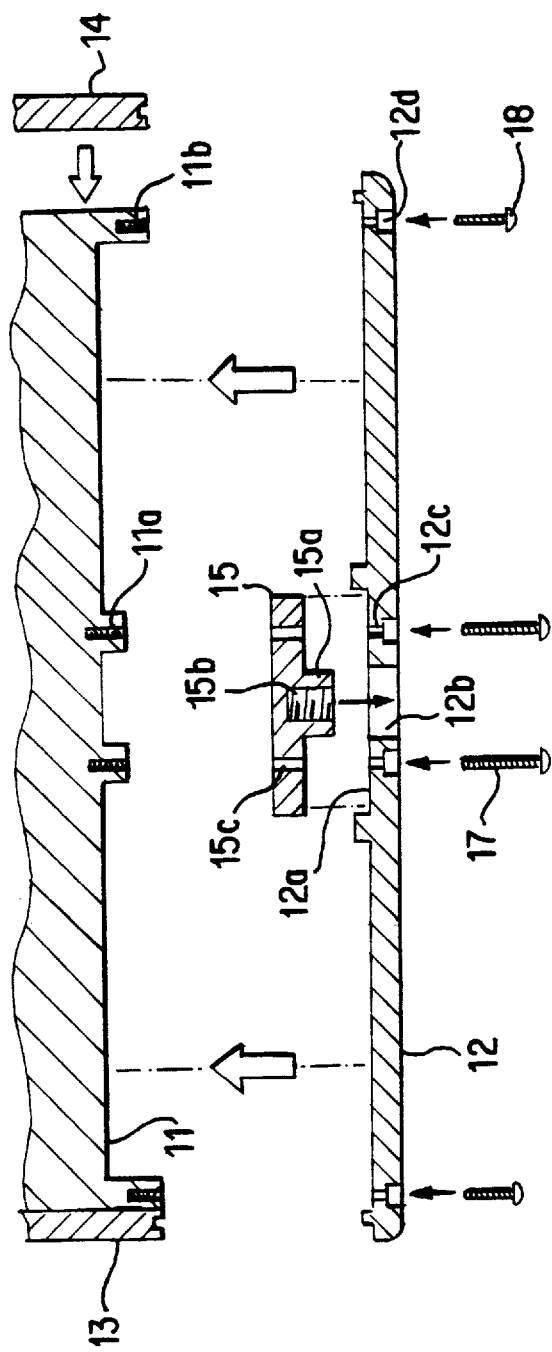
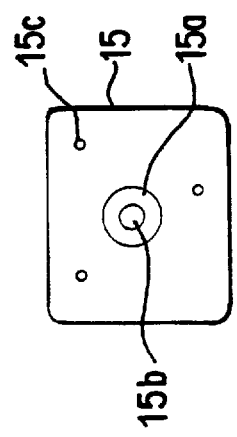
FIG. 3a
FIG. 3b

WATERPROOF CONSTRUCTION FOR CAMERA WITH CARRYING STRAP

BACKGROUND OF THE INVENTION

1. Field of The Invention

The present invention relates to a waterproof construction for a camera wherein a part of a member fixedly attached to the exterior surface of a camera body frame is exposed from an opening in a body cover which covers said body frame.

2. Description of The Related Art

Conventionally, a ring 22, for example, is fixedly attached to the exterior surface of a camera body frame 21 to allow attachment of a strap to the camera, as shown in FIG. 5, and generally a more or less L-shaped (when viewed from the side) fitting is used as said ring 22. This ring 22 comprises an anchor leg 22a on one leg of the L-shape member, and a strap mount 22b on the other leg of the L-shaped member. After this ring 22 is fixedly attached to the body frame 21 via mounting screws, the strap mount 22b protrudes, a body cover 23 having an opening 23a is mounted on the body frame 21 such that the protruding strap mount 22b is exposed through said opening 23a of body cover 23.

In the aforesaid construction, there is concern that water may penetrate into the body cover 23 from the space between the opening 23a and the strap mount 22b because the strap mount 22b protrudes from the opening 23a of the body cover 23. Furthermore, in the aforesaid construction, it is difficult to achieve a waterproof construction by providing a seal member between the aforesaid members 22 and 23 because the body frame 22 is covered by body cover 23 after the ring 22 is attached to the body frame 21. Consideration has been given to attaching the ring 22 to the body frame 21 after the body cover 23 has been attached to the body frame 21, but such an arrangement detracts from the appearance of the construction and adequate attaching strength cannot be obtained. The concerns of these disadvantages pertain not only to the ring 22 but also similarly arise in relation to other components such as a tripod base attached to the bottom surface of body frame 21.

OBJECTS AND SUMMARY

A main object of the present invention is to provide a waterproof construction for a camera capable of preventing water penetration into the interior of a body cover by means of a simple construction.

Another object of the present invention is to prevent water penetration into the interior of a body cover from a part of the body cover which covers members such as a ring fixedly attached to the camera body frame.

These and other objects of the present invention are accomplished by providing a camera comprising a body frame, a body cover which covers the body frame and has an opening, a member which is exposed through the opening of the body cover and attached to the interior surface of the body cover, and a seal member which seals the gap formed between said member and the opening of the body cover.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 3(a) is an exploded view of a second embodiment of the waterproof construction for cameras of the present invention, and FIG. 3(b) is a bottom view of a tripod base;

DETAILED DESCRIPTION OF THE PREFERRED EMBODIMENTS

Figure 1:
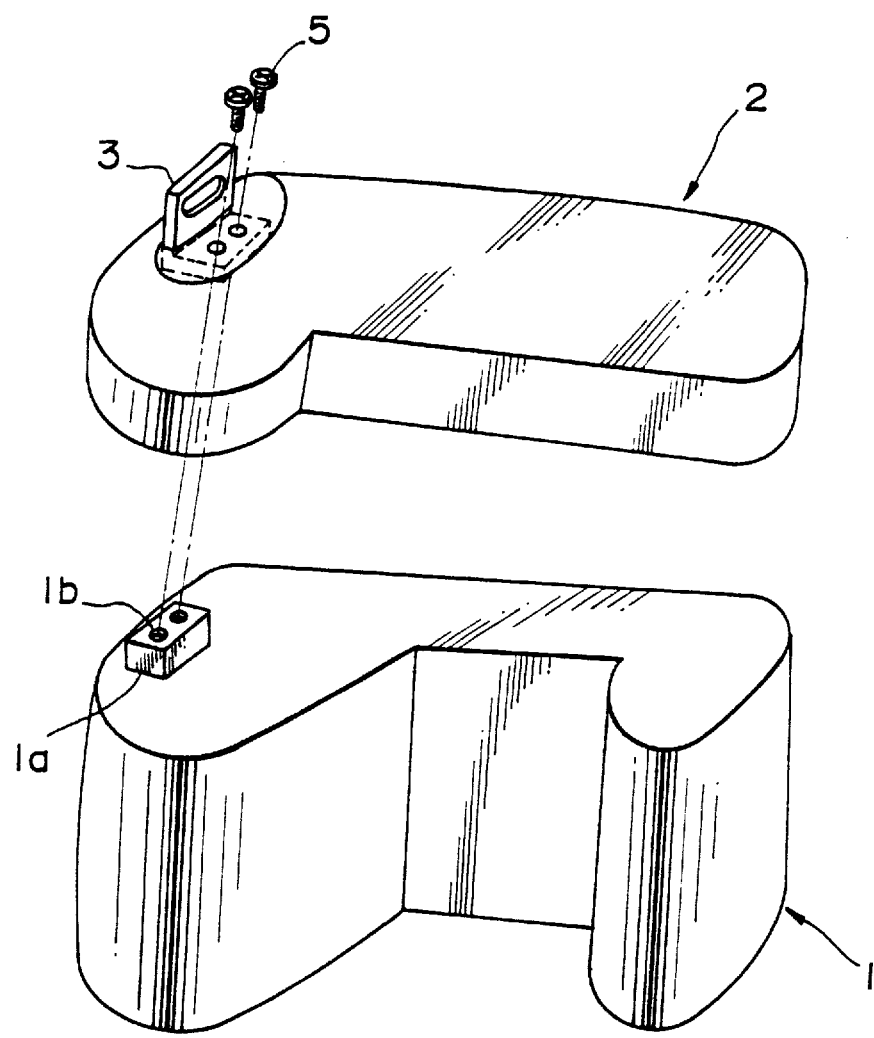
FIG. 1 is an exploded perspective view of a first embodiment of the waterproof construction for cameras of the present invention.
Figure 2A:
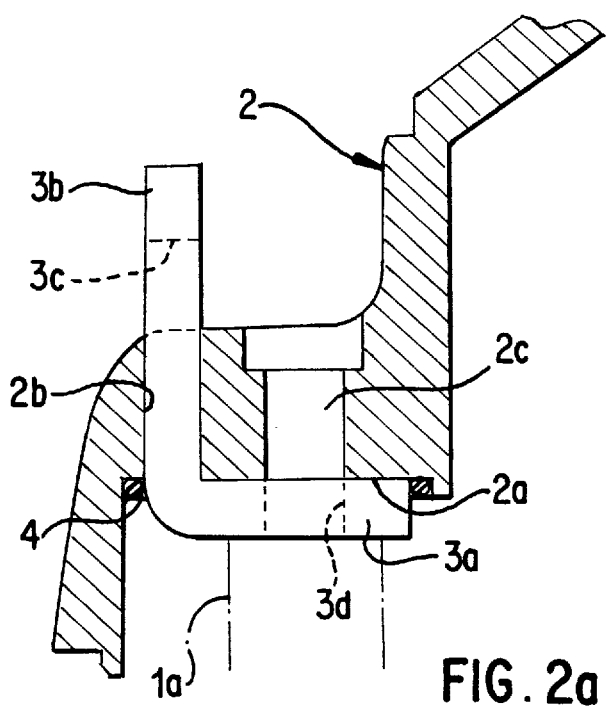
FIG. 2(a) is an enlarged section view of the essential portion of the waterproof construction of FIG. 1.
Figure 2B:
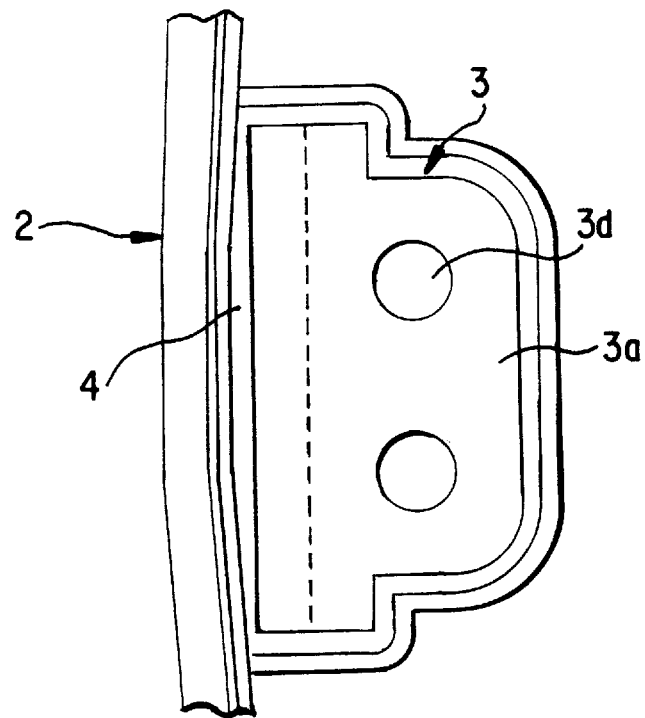
FIG. 2(b) is a bottom view of FIG. 2(a)

The preferred embodiments of the waterproof construction for cameras of the present invention are described fully hereinafter with reference to FIGS. 1 through 4. A first embodiment shown in FIGS. 1 and 2 is described first below. FIG. 1 is an exploded perspective view of the waterproof construction, FIG. 2(a) is an enlarged section view of the essential portions, and FIG. 2(b) is a bottom view of FIG. 2(a).

In the drawings, reference number 1 refers to a body frame, and reference number 2 refers to a body top cover. The top body cover 2 is attached to body frame 1 at several locations on the peripheral edge portion via machine screws not shown in the drawings. Reference number 3 refers to a ring for mounting a strap (not shown in the drawings), said ring being an L-shaped fitting comprising an anchor leg 3a attached to body frame 1, and a strap mount leg 3b. A slot 3c is formed on strap mount leg 3b to allow the attachment of a strap.

The interior surface of top body cover 2 is provided with a bearing surface 2a for holding the ring 3, said ring 3 being held on the body top cover 2 via an adhesive 4 applied to the entire surface of the anchor leg 3a with the top surface of said anchor leg 3a of ring 3 is in a state of contact with said bearing surface 2a. An opening 2b is formed in the top body cover 2 to allow exposure of the ring 3 strap mount leg 3b which protrudes through said opening 2b. Attachment holes 2c and 3d are provided through top body cover 2 and ring 3 to allow insertion of mounting screws 5 on said top body cover 2 and ring 3, and the body frame 1 is provided with a mount 1a having screw holes 1b for the mounting screws 5.

In the aforesaid construction, ring 3 is first attached to the interior surface of top body cover 2 by adhesive 4, such that the strap mount leg 3b protrudes from the opening 2b of the top body cover 2. The space between the top body cover 2 and the ring 3 is completely sealed because adhesive 4 is applied to the entire surface of anchor leg 3a of ring 3. Then, the top body cover 2 is attached to body frame 1 at several locations on the peripheral edge portion via machine screws, and mounting screws 5 are inserted into mounting holes 2c and 3d formed in the ring 3 and the top body cover 2, and said mounting screws 5 are tightened in the screw holes 1b of body frame 1.

Thus, suitable mounting strength is assured because ring 3 is firmly held to both top body cover 2 and body frame 1. Furthermore, water is prevented from penetrating through opening 2b of the top body cover 2 when said top body cover 2 is attached to body frame 1 because the ring 3 is sealed beforehand held by the interior surface of body frame 1.

Although adhesive for attaching ring 3 to top body cover 2 is used as a seal member to close the gap at opening 2b, a seal member and mounting means may be provided separately insofar as the gap at opening 2b is sealed when ring 3 is held on top body cover 2.

Figure 4A:
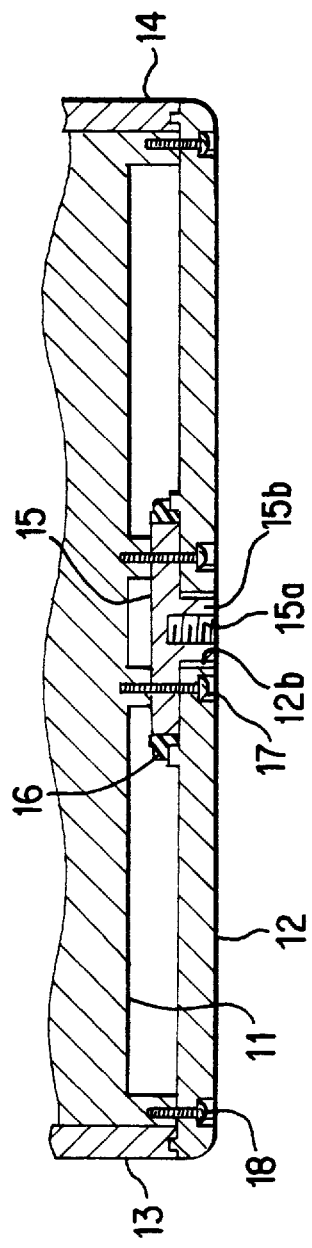
FIG. 4(a) is a section view of the waterproof construction of FIG. 3.
Figure 4B:
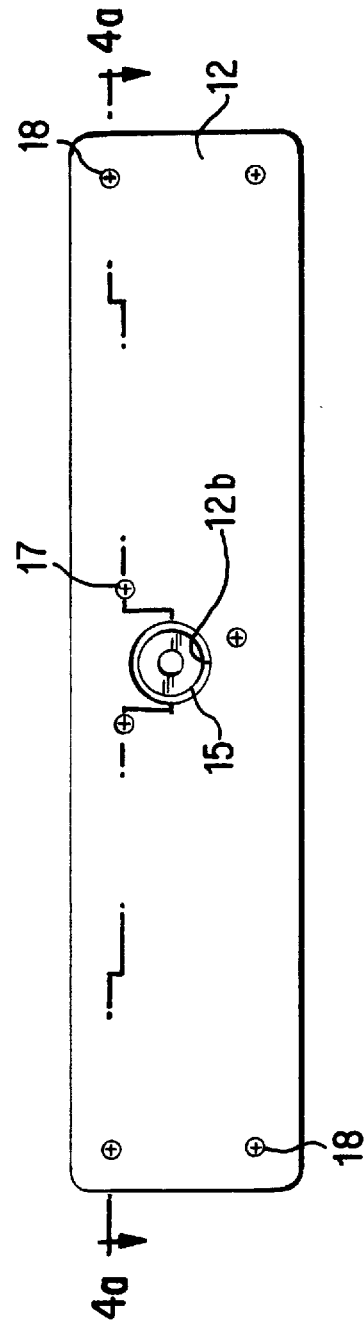
FIG. 4(b) is a bottom view of FIG. 4(a).
Figure 5:
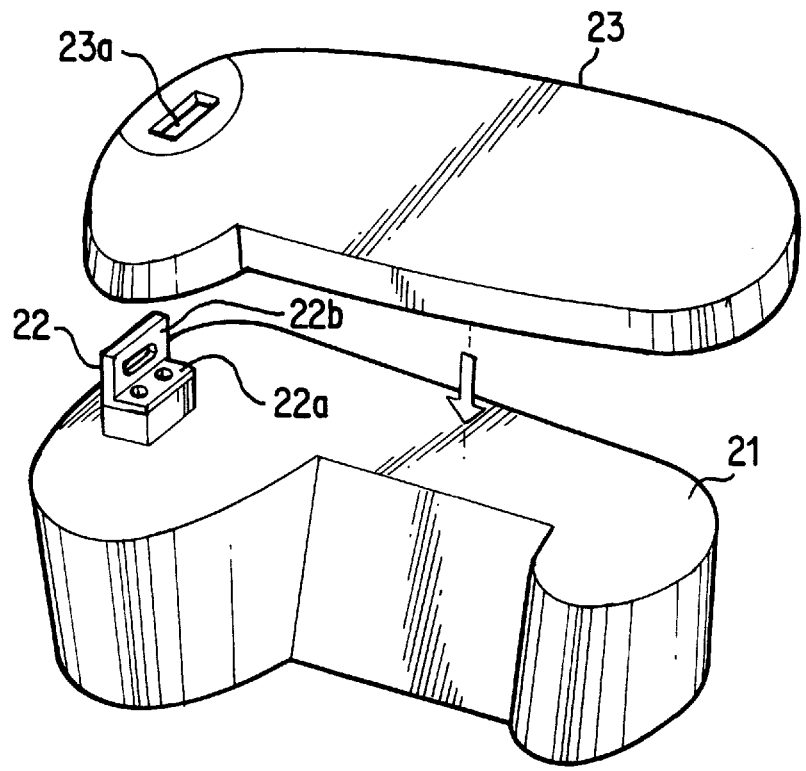
FIG. 5 illustrates a conventional structure.

A second embodiment is described below with reference to FIGS. 3 and 4. This embodiment shows the present invention adapted to the mount on a base used to mount a tripod. FIG. 3(a) is an exploded view of this waterproof construction, and FIG. 3(b) is a bottom view of the tripod mount base. FIG. 4(a) is a section view of the waterproof construction (i.e., a section view on line A—A of FIG. 4(b)), and FIG. 4(b) is a bottom view.

In the drawings, reference number 11 refers to a body frame, reference number 12 refers to a bottom body cover, reference numbers 13 and 14 refer to side body covers, and reference number 15 refers to a tripod mount base. In this example, the bottom body cover 12 is fixedly attached to the body frame 11 after the base 15 is mounted to the top surface (interior surface) of the bottom body cover 12.

The base 15 has a boss 15a in the center of the bottom surface, and a tripod mount screw hole 15b is provided in said boss 15a. On the other hand, the center top surface of bottom body cover 12 is provided with a bearing surface 12a for installing the base 15, and the center of said bearing surface 12a is provided with an opening 12b into which the boss 15a is inserted. Base 15 is fixedly attached to bottom body cover 12 by an application of adhesive 16 such as silicone bond or the like over the entire periphery of the base 15 installed on bearing surface 12a of bottom body cover 12.

Mounting holes 12c and 15c are formed in a vertical direction through base 15 and bottom body cover 12, and screw holes 11a are formed in body frame 11 to fasten base 15 and bottom body cover 12 together to body frame 11 by tightening mounting screws 17 in mounting holes 12c and 15c. The bottom body cover 12 is attached to body frame 11 at the four corners after side body covers 13 and 14 are attached to the body frame 11 and, therefore, mounting screws 18 passing through mounting holes 12d formed on bottom body cover 12 are tightened in screw holes 11b of the body frame 11.

Water is prevented from penetrating through opening 12b when bottom body cover 12 is attached to body frame because the base 15 is fixedly attached to bottom body cover 12 with the gap between said base 15 and opening 12b sealed by the application of adhesive 16 around the entire periphery thereof. Furthermore, adequate mounting strength is assured because tripod base 15 and bottom body cover 12 are fastened together to body frame 11.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera comprising:

a body frame:

a body cover which covers the body frame and has an opening:

a member which is exposed through the opening of the body cover and fixedly attached to an interior surface of the body cover:

a seal member which seals a gap formed between said member and the opening of the body cover:

mounting holes penetrating through both said body cover and said member; and screw holes provided on said body frame so as to tighten mounting screws passing through both the mounting holes and the screw holes.

2. A camera comprising:

a body frame:

a body cover which covers the body frame and has an opening;

a member which is exposed through the opening of the body cover and fixedly attached to an interior surface of the body cover:

a seal member which seals a gap formed between said member and the opening of the body cover, wherein said member is a ring for mounting a strap which includes an anchor attached to the body cover and a strap mount leg exposed from the opening of the body cover.

3. A camera comprising:

a body frame:

a body cover which covers the body frame and has an opening:

a member which is exposed through the opening of the body cover and fixedly attached to an interior surface of the body cover:

a seal member which seals a gap formed between said member and the opening of the body cover, wherein said member is a tripod mount base and said seal member is an adhesive.

4. A waterproof construction of a camera in which a portion of a member which is to be fixed to an exterior surface of a body frame of the camera is exposed from an opening provided on a body cover covering the body frame, the construction comprising:

means for fixedly attaching said member to an interior surface of the body cover;

means for sealing a gap between said member and the body cover;

means for attaching the body cover to the body frame; and wherein said member is a ring for mounting a strap.

5. A waterproof construction of a camera in which a portion of a member which is to be fixed to an exterior surface of a body frame of the camera is exposed from an opening provided on a body cover covering the body frame, the construction comprising:

means for fixedly attaching said member to an interior surface of the body cover;

means for sealing a gap between said member and the body cover:

means for attaching the body cover to the body frame: and wherein said member is a tripod mount base.

* * * * *